US006757083B1

(12) United States Patent
Nakamura (10) Patent No.: US 6,757,083 B1
(45) Date of Patent: Jun. 29, 2004

(54) IMAGE INPUT APPARATUS (75) Inventor: Hiroaki Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/213,902

(22) Filed: Dec. 17, 1998

(30) Foreign Application Priority Data

Dec. 17, 1997 (JP) .............................. 9-347862

(51) Int. Cl.[7] .............................................. H04N 8/04
(52) U.S. Cl. ...................... 358/487; 382/312; 355/82
(58) Field of Search ......................... 358/487; 382/312, 382/318, 254, 317, 274; 355/82, 40

(56) References Cited

U.S. PATENT DOCUMENTS

| 5,068,804 | A | * | 11/1991 | Watanabe | ................... | 395/147 |
| 5,223,954 | A | * | 6/1993 | Miyakawa et al. | ........ | 358/474 |
| 5,276,511 | A | * | 1/1994 | Takemoto | .................. | 358/527 |
| 5,832,133 | A | * | 11/1998 | Smith | ......................... | 382/254 |
| 5,920,680 | A | * | 7/1999 | Inoue et al. | ................ | 395/101 |
| 5,991,010 | A | * | 11/1999 | Nishio | .......................... | 355/82 |
| 6,072,916 | A | * | 6/2000 | Suzuki | ....................... | 382/303 |
| 6,188,807 | B1 | * | 2/2001 | Arakawa | .................... | 382/319 |

FOREIGN PATENT DOCUMENTS

JP          09-214686           8/1997

* cited by examiner

*Primary Examiner*—Kimberly Williams
*Assistant Examiner*—Negussie Worku
(74) *Attorney, Agent, or Firm*—Birch, Stewart, Kolasch & Birch, LLP

(57) ABSTRACT

There is provided an image input apparatus for photoelectrically reading an image and applying predetermined image processing to image data obtained so as to provide output image data comprising a pre-reading section, a processing-condition setting section, a display section, an adjusting section, a read-condition determining section, a section for definitely deciding the image processing conditions and a designating section. According to the image input apparatus, it is possible to stably output a print (visible image) reproduced from a quality image by properly making a reproduction of the image.

32 Claims, 5 Drawing Sheets

IMAGE INPUT APPARATUS

BACKGROUND OF THE INVENTION

The present invention pertains to a technical field where image input apparatuss are utilized for digital photoprinters for photoelectrically reading images recorded on films to obtain prints (photographs) that have been reproduced from the images.

Images recorded on photographic films (hereinafter called the films) such as negative films, reversal films and the like are mainly printed out on photosensitive material (photographic paper) now by projecting the on-film image onto the photosensitive material so that the photosensitive material is subjected to surface exposure or so-called direct exposure (analog exposure).

On the other hand, printing apparatus utilizing digital exposure have been put to practical use in recent years; more specifically, a digital photoprinter is used for printing out (finishing off) an image recorded on a film through the steps of photoelectrically reading the image, converting the read-out image into a digital signal, performing various sorts of image processing in order to obtain image data to be recorded and subjecting photosensitive material to scanning exposure by means of the recording light modulated according to the image data, whereby to record the image (latent image).

As exposure conditions at the time of printing can be determined by processing images with digital data as image data in the digital photoprinter, high-grade prints that have been unavailable until now become obtainable by making compensation for image fade-out and improper gradation such as, washed-out highlight and dull shadow originating from backlight, electronic flashing and the like, sharpness processing, compensation for color or density failure and so forth. Moreover, a composite photograph using a plurality of images, image division, a composition of characters and the like can be attained by processing the image data, which makes it possible to output edited/processed prints freely according to intended uses.

Furthermore, the digital photoprinter makes image data utilizable for various purposes other than photography because it allows output images as prints (photographs) and also allows the image data to be not only supplied to a computer, for example, but also stored in optical and/or magnetic recording media such as floppy disks and so on.

Such a digital photoprinter as described above essentially comprises an image input apparatus having a scanner (image reading apparatus) for photoelectrically reading an image recorded on a film and an image processing apparatus for subjecting the read-out image to image processing in order to provide output image data (exposure conditions), and an image output apparatus having a printer (image recording apparatus) for recording a latent image by subjecting photosensitive material to scanning exposure according to the image data outputted from the image input apparatus and a processor (developing apparatus) for subjecting the exposed photosensitive material to developing processing for printing purposes.

The operation of the scanner includes making read light emitted from a light source incident on a film to obtain projected light for carrying an image projected on the film, effecting image formation in an image sensor such as a charge coupled device (CCD) by means of an image forming lens so as to read the image by subjecting the projected light to photoelectric conversion, performing various kinds of image processing as occasion demands and sending data concerning the on-film image (image data signal) to the image processing apparatus.

The operation of the image processing apparatus includes setting image processing conditions according to the image data read by the scanner, applying image processing corresponding to the set conditions to the image data and sending output image recording data (exposure conditions) to the printer.

The operation of the printer, that is, a printer utilizing light beam scanning exposure, for example, includes modulating a light beam according to the image data sent from the image processing apparatus, deflecting the light beam in the main scanning direction, transporting the photosensitive material in a auxiliary scanning direction perpendicular to the main scanning direction in order to form a latent image by exposing (printing) the photosensitive material, using the light beam that carries the image therewith and performing developing processing corresponding to the photosensitive material in the processor in order to make a print (photograph) reproduced from the on-film image.

When an image is photoelectrically read by the image input apparatus in the digital photoprinter, pre-scanning (pre-reading) for reading an original with low resolution is usually carried out prior to image reading (main reading, that is, main scanning) for obtaining output image data and the image data obtained from the pre-scanning is used for setting read conditions for the main scanning and (image) processing conditions for acquiring the output image data by processing the image data obtained from the main scanning.

Moreover, the processing conditions are appropriately adjusted by an operator who examines the conditions as the need arises.

The read conditions at the time of the main scanning are set from the image data obtained from the pre-scanning so that the output of the image sensor such as a CCD is not saturated but equivalent to the minimum possible quantity of light with the lowest density of the original image; more specifically, the quantity of read light (adjusted stopping value), the accumulatable time of the CCD sensor and the like are set to accomplish the aforesaid conditions.

Thus, the whole density range of the original image can be read in the widest dynamic range.

However, because the scanner is restricted by the dynamic range, the S/N ratio and the like, the read conditions at the time of the main scanning like this make photographic conditions unfavorable and when the dynamic range of density of the on-film image is wide, a print embodying a high-quality image may not be reproduced even though the image data obtained from the main scanning is properly processed.

For example, the primary object (normally, the face of a person) in a print is required to be appropriately finished and even in a case where photographic conditions are bad because of shooting a backlight scene or a scene with electronic flashing, priority is given to a face other than the rest of the image reproduced in print and the face is suitably processed in order that it is finished without being faded out.

In the above case, therefore, the image processing conditions (density compensating conditions) are set in such a manner as to suitably finish a high- or a low-density portion in proportion to the density of the face of the person taken on the film. However, the face in the print reproduced from the image looks sandy though the image processing is used to prevent the face from being faded out by adjusting the density thereof. In extreme cases, an unsuitable print is reproduced and even when such an unsuitable print is not reproduced, a high-quality image is never reproduced.

SUMMARY OF THE INVENTION

An object of the present invention intended to solve the foregoing problems in the prior art is to provide an image input apparatus for furnishing output image data by carrying out pre-scanning and main scanning in order to photoelectrically read an on-film image, which image input apparatus is capable of stably outputting a high-quality image by reading the on-film image even though photographic conditions are bad because of shooting a backlight scene or a scene with electronic flashing and even though the image has a wide dynamic range of density.

In order to solve the foregoing problems, an image input apparatus for photoelectrically reading an image and applying predetermined image processing to image data obtained so as to provide output image data according to the present invention comprises pre-reading means for reading the image before main reading is carried out to obtain the output image data, processing condition setting means for setting image processing conditions according to the image data obtained from the pre-reading, display means for processing the image data obtained from the pre-reading according to the image processing conditions set by the processing-condition setting means and displaying the processed image data, adjusting means for designating the adjustment of the image processing conditions set by the processing-condition setting means after the image is displayed on the display means, read-condition determining means for determining main read conditions according to the image data obtained from the pre-reading and the designation of the adjustment of the image processing conditions specified by the adjusting means, means for definitely deciding the image processing conditions, and designating means for designating the commencement of the main reading.

Furthermore, it is preferred that the read means for photoelectrically reading the original image is a CCD sensor; the designation of the adjustment of the image processing conditions to be reflected in the main read conditions determined by the read-condition determining means is concerned with the adjustment of the density and the tinting; and the read conditions affected by the adjustment signify at least one of the adjustment of the quantity of light and the accumulatable time of the CCD sensor.

DETAILED DESCRIPTION OF THE INVENTION

A detailed description will subsequently be given of the preferred embodiment of an image input apparatus according to the present invention with reference to the accompanying drawings.

Figure 1:
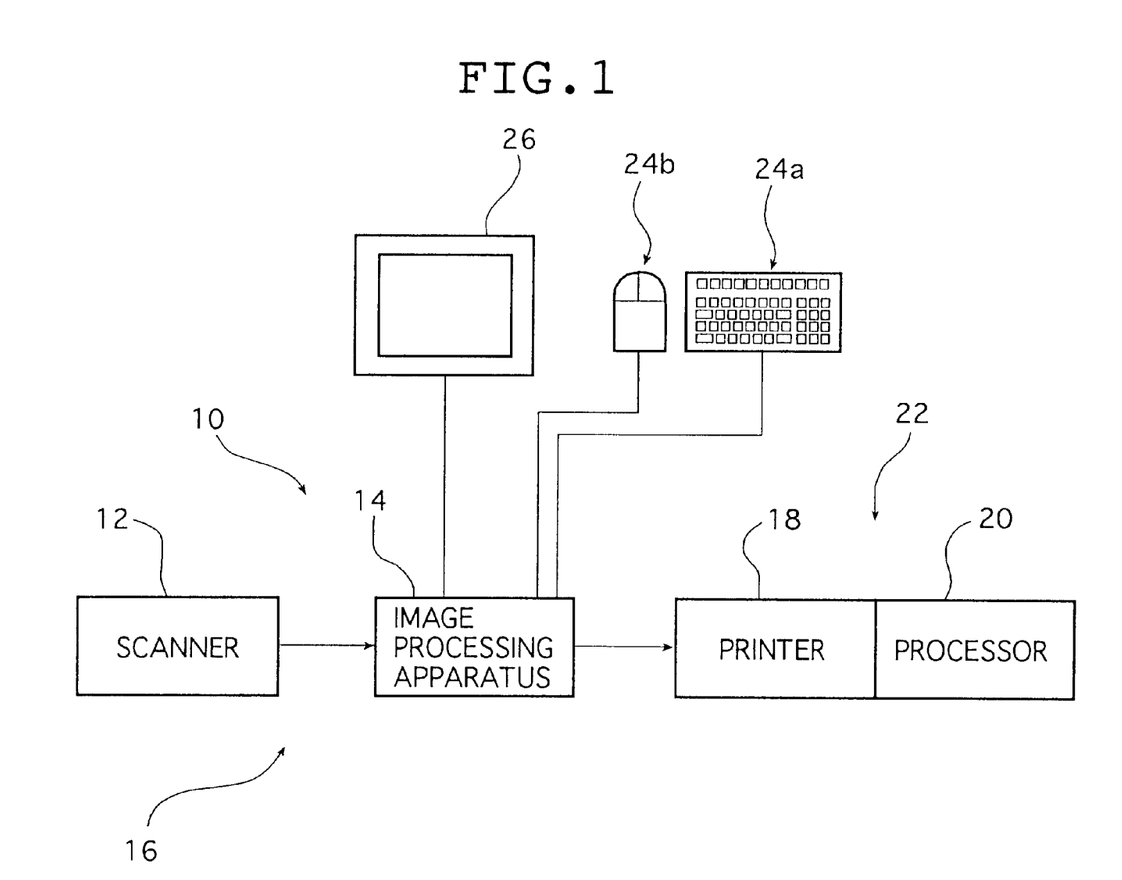
FIG. 1 is a block diagram of an embodiment of a photograph printing and developing machine utilizing an image input apparatus according to the present invention.

FIG. 1 is a block diagram of a photograph printing and developing machine utilizing an image input apparatus according to the present invention.

A photograph printing and developing machine 10 shown in FIG. 1 is the aforesaid digital photoprinter and comprises an input apparatus 16 having a scanner 12 for photoelectrically reading an image taken onto a film F and an image processing apparatus 14 for reducing the image data read by the scanner 12 to output image data, and an output apparatus 22 having a printer 18 for recording a latent image by subjecting photosensitive material (photographic paper) to scanning exposure with a light beam which is modulated according to the image data outputted from the image processing apparatus 14, and a processor 20 for subjecting the exposed photosensitive material to a wet developing and a dry process in order to output a print (finishing off). In this case, the input apparatus 16 is equivalent to the image input apparatus according to the present invention.

Furthermore, a keyboard 24a and a mouse 24b for entering (setting) various conditions, selection and designation of a process, designation of color/density compensation and the like and a display 26 for displaying the image read by the scanner 12, designation of various operations, setting of various conditions/registered screen and the like are connected to the image processing apparatus 14.

Figure 2A:
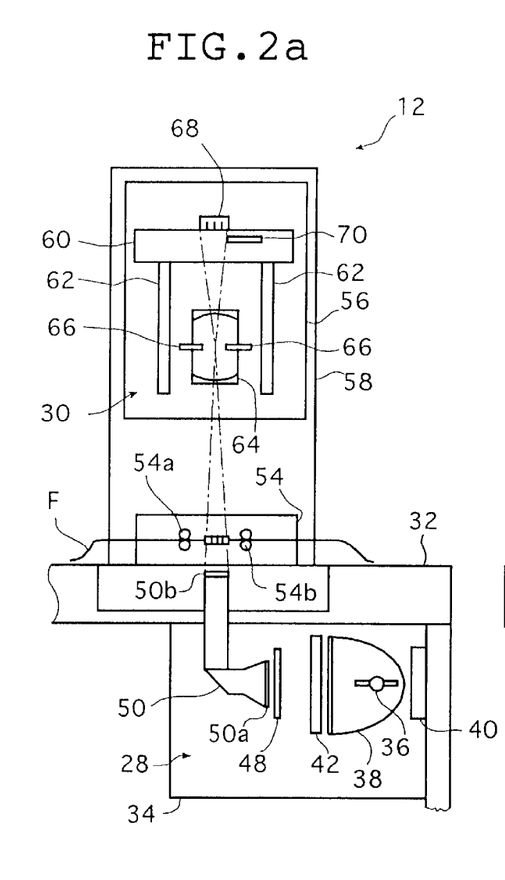
FIGS. 2a and 2b are a schematic elevational view and a schematic side view of a scanner of the photograph printing and developing machine shown in FIG. 1, respectively.
Figure 2B:
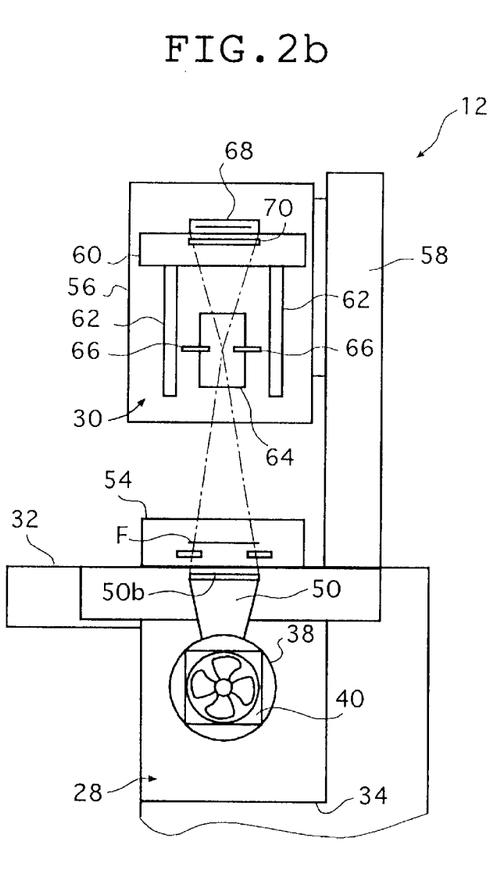

FIGS. 2a and 2b are schematic diagrams of the scanner 12. FIG. 2a is an elevational view of the scanner 12; and FIG. 2b is a side view thereof.

The scanner 12 comprises a light source section 28 and a read section 30.

The light source section 28 is contained in a casing 34 beneath the work table 32 of the scanner 12 (input apparatus 16) and a read light source 36 is disposed on the right-hand side of the casing 34 shown in FIG. 2a. As the light source 36, use can be made of any one of the various light sources utilized for ordinary photoelectric image input apparatuss such as a halogen lamp, a metal halide lamp and the like as long as the light source has a sufficient quantity of light. A reflector 38 for making the light emitted from the light source 36 efficiently incident on the film F is disposed around the light source 36. A cooling fan 40 for cooling and keeping the interior at a predetermined temperature is also disposed in the casing 34.

A UV/IR cut-off filter (ultraviolet light and infrared light cut-off means) 42 for cutting off light having wavelengths in ultraviolet and infrared zones in order to improve read precision by preventing the temperature of the film F from rising, a variable diaphragm 48 and a light diffusion box 50 are arranged in the downstream direction (hereinafter called the downstream) in which the light emitted from the light source 36 advances.

The variable diaphragm 48 is used for adjusting the quantity of read light.

Figure 3:
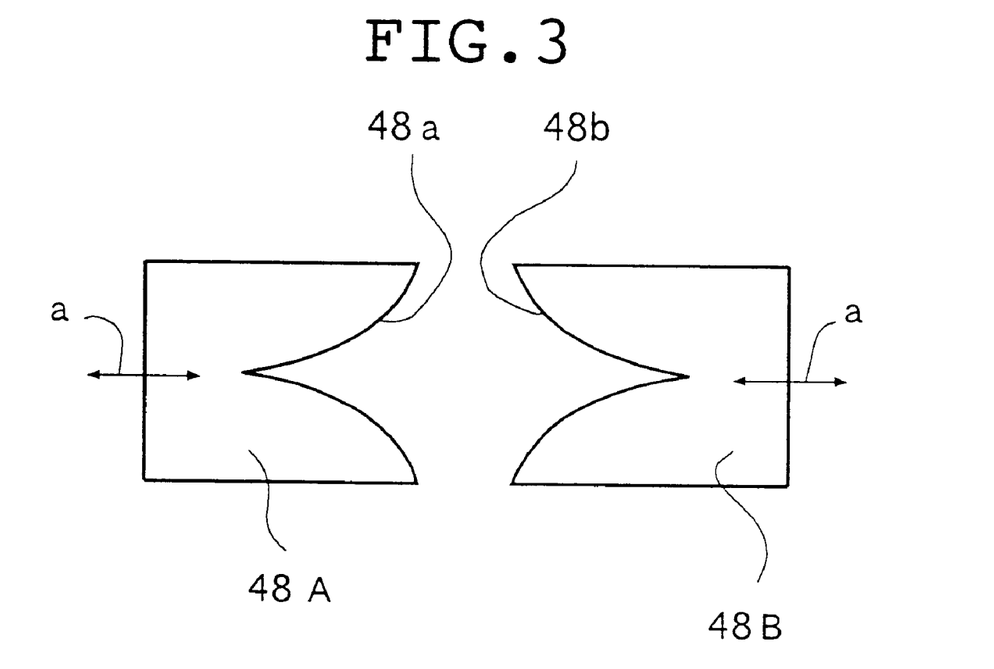
FIG. 3 is a conceptual drawing of a variable diaphragm disposed in the scanner shown in FIGS. 2a and 2b.

As shown in FIG. 3, the variable diaphragm 48 in an example shown therein essentially consists of two pieces of plate members 48A, 48B which are disposed opposite on a plane intersecting an optical axis orthogonally with the optical axis placed therebetween and set slidable so that both plate members 48A, 48B are brought into contact with and separated from each other. Cutouts 48a, 48b are each formed in both plate members 48A, 48B in such a manner that the areas of the plate members 48A, 48B are gradually increased reversely in their sliding directions (directions indicated by double-headed arrows a) from their facing sides.

Consequently, the quantity of light passing through the variable diaphragm 48, that is, the quantity of read light can be adjusted by bringing the plate members 48A, 48B disposed opposite with the optical axis placed therebetween into contact with and separating them from each other so as to adjust the area of the aperture formed with the cutouts 48a, 48b. In this case, the plate members 48A, 48B are moved by a diaphragm driving motor 86M as will be described hereinafter and their positions are detected by a diaphragm position sensor 86S. The adjustment of the quantity of light by the variable diaphragm 48 may be controlled by a known method using, for example, the number of moving pulses of the plate members 48A, 48B.

The light diffusion box 50 is a substantially L-shaped cylindrical body which is bent at right angles in its intermediate portion and extended upward. At both opening ends of the light diffusion box 50, that is, at its read light incident and emission ports, light diffusion plates 50a, 50b are each disposed in such a manner as to close the opening faces and a mirror for reflecting light in 90° different directions is provided in the bent portion.

The emission port of the light diffusion box 50 is in the form of a slit extending in the same direction as that of an image sensor 68 (line CCD sensor) which will be described hereinafter and the shape on the downstream side of the bent portion of the cylindrical body forming the light diffusion box 50 corresponds to the form of the slit.

Consequently, light incident on the light diffusion box 50 is diffused by the light diffusion plates 50a, 50b and emitted as slit light extending in the same direction as that of the image sensor 68. The length of the slit light is set so that the whole area in the width direction of the film F is satisfactorily irradiated with the light in proportion to the film F of maximum width read by the scanner 12.

As aforesaid, the light source section 28 is located beneath the work table 32.

The keyboard 24a, the mouse 24b and the display 26 are mounted on the surface of the work table 32 in such a position that the optical system remains unaffected thereby and a carrier 54 is kept detachable in a predetermined position corresponding to the emission port of the light diffusion box 50.

In the scanner 12, the exclusive carrier 54 which is mountable in the predetermined position of the work table 32 is provided in correspondence with the advanced photo system, the negative of 135 in size or the kind and size of the reversal film (strip), and the form of the film such as a strip, a slide and the like. Thus, various films can be dealt with by replacing the carrier 54.

The scanner 12 shown in FIGS. 2a and 2b is used to read the image taken onto the film F by means of slit scanning. While held in a predetermined read position corresponding to the emission port of the light diffusion box 50, the film is scan-transported by the carrier 54 in a direction perpendicular to the slit (hereinafter called the auxiliary scanning direction) and irradiated with slit-like read light from below, whereby the read light is used to scan the whole surface of the film so as to obtain projection light for carrying the on-film image.

In FIGS. 2a and 2b, the film F is a strip of continuous length on which a plurality of images (frames) can be photographed and the carrier 54 scan-transports the film F in the longitudinal direction of the film F and the auxiliary scanning direction which coincide with each other by the use of carrier rollers 54a, 54b which are disposed with the read position placed therebetween in the auxiliary scanning direction. Thus, the images in the respective frames photographed on the film F are successively read by the scanner 12 with slit-scanning.

Furthermore, the carrier 54 is simultaneously used as a mask for regulating read light incident on the film F and/or the projection light transmitted through the film F in a predetermined slit form.

As is well known, a transparent magnetic recording medium is formed on the film F in the advanced photo system. Information concerning the film F such as the kind of film, cartridge ID and the like is magnetically recorded on the magnetic recording medium. Moreover, various items of data including print size, photographed date, the presence or absence of electronic flashing when the photograph is taken, the kind of camera, the kind of film developing apparatus, developing date, the kind of photoprinter, printing date and the like are magnetically recorded as occasion demands at the time of photographing, developing and printing.

A magnetic information reading means is disposed in the carrier corresponding to the film (cartridge) in the Advanced Photo System and when the film is transported to the read position, various sorts of magnetic information are read and sent to the image processing apparatus 14.

The read section 30 is disposed above the work table 32, the read section 30 being contained in a casing 56.

An optical frame 58 is vertically installed on the surface of the work table 32 and the casing 56 is supported by the optical frame 58 movably in the direction of bringing the casing 56 into contact with and separating the casing 56 from the work table 32 (i.e., the direction of advancing the focal point of a lens unit 64 and hereinafter called the vertical direction).

A mounting table 60 is provided in the casing 56 and a plurality of supporting rails 62 are suspended from the mounting table 60. The lens unit 64 is vertically movably supported by the supporting rails 62.

The lens unit 64 is an image forming lens unit having a plurality of lenses and used for converting the projection light transmitted through the film F into an image formed on the image sensor 68.

A lens diaphragm 66 is disposed in between the lenses of the lens unit 64. The lens diaphragm 66 is an iris diaphragm, for example, and driven by a lens-diaphragm driving motor 92 which will be described hereinafter, whereby to adjust the quantity of projection light to be formed into an image after being passed through the lens diaphragm 66, that is, the lens unit 64.

The image sensor 68 is mounted on the surface of the mounting table 60.

The image sensor 68 has three line CCD sensors each comprising a number of CCD cells arranged in a row and electronic shutter mechanisms, and is extended in the main scanning direction intersecting the auxiliary scanning direction orthogonally at predetermined intervals in the auxiliary scanning direction. The line CCD sensors are mounted with red (R), green (G) and blue (B) color filters (so-called three lines of color CCD sensors) on the light incident sides of the respective line CCD sensors. Moreover, each line CCD sensor is provided with a transfer portion and the charge accumulated in each CCD cell (pixel) of each line CCD sensor is sequentially transferred via the corresponding transfer portion.

Furthermore, a shutter 70 for acquiring data for dark correction of the image sensor 68 is disposed on the upstream side (lower side) of the image sensor 68.

Figure 4:
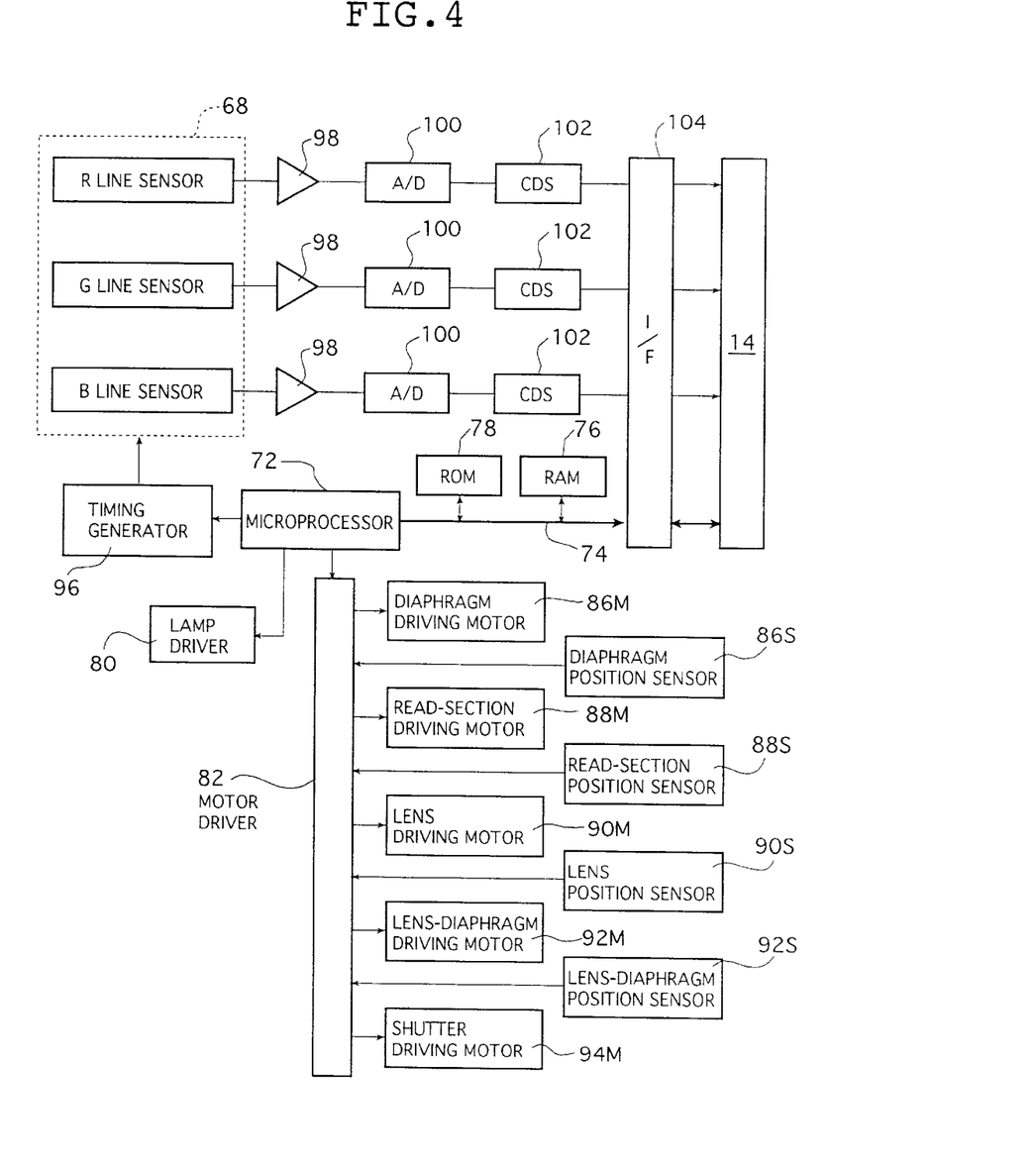
FIG. 4 is a block diagram of an electrical system of the scanner shown in FIGS. 2a and 2b.

FIG. 4 is a schematic block diagram of the electrical system of the scanner 12.

The scanner 12 has a microprocessor 72 for controlling the whole scanner 12, and RAN 76 and ROM 78 (e.g., a rewritable ROM) are connected via a bus 74 to the microprocessor 72, a lamp driver 80 as well as a motor driver 82 being also connected to the microprocessor 72.

The lamp driver 80 operates to switch the light source 36 on and off according to the instruction from the microprocessor 72.

On the other hand, the following component parts are connected to the motor driver 82: a diaphragm driving motor 86M for slidably moving the plate members 48A, 48B of the variable diaphragm 48 so as to adjust; a diaphragm position sensor 86S for detecting the positions of the plate members 48A, 48B of the variable diaphragm 48 (stopping quantity); a read-section driving motor 88M for vertically moving the casing 56 for containing the read section 30; a read-section position sensor 88S for detecting the position of the casing 56 (i.e., read section 30); a lens driving motor 90M for vertically moving the lens unit 64; a lens position sensor 90S for detecting the position of the lens unit 64; a lens-diaphragm driving motor 92M for adjusting the lens diaphragm 66; a lens-diaphragm position sensor 92S for detecting the position of the lens diaphragm 66 (stopping quantity); and a shutter driving motor 94M for switching the shutter 70 between full-closed and full-opened conditions.

When the on-film image is read by the image sensor 68, the microprocessor 72 makes the diaphragm driving motor 86M adjust the variable diaphragm 48 according to the position of the variable diaphragm 48 and the set read conditions in order to adjust the quantity of light incident on the film F.

Moreover, the microprocessor 72 determines a zooming magnification according to the designation of the size and variable magnification of the film F, makes the read-section driving motor 88M vertically move the casing 56 according to the position of the casing 56 detected by the read-section position sensor 88S and also makes the lens driving motor 90M vertically move the lens unit 64 according to the position of the lens unit 64 detected by the lens position sensor 90S, so that the projection light transmitted through the film F is formed into an image in the image sensor 68 in conformity with the zooming magnification.

The focus control (auto focus control) carried out as the need arises is carried out by the read-section driving motor 88M through only the vertical movement of the casing 56. In this case, the method of effecting the focus control is not necessarily restrictive but a contrast method for adjusting the position of the casing 56, for example, may be employed for maximizing the contrast of the film F read by the image sensor 68.

On the other hand, a timing generator 96 for generating various timing signals (clock signals) for operating the image sensor 68, analog/digital (A/D) converters 100 and the like is connected to the image sensor 68.

Each signal output from the image sensor 68 is amplified by an amplifier 98 before being converted by the A/D converter 100 into digital image data.

The digital image data thus obtained in the A/D converter 100 is processed in a correlated double sampling circuit (CDS) 102 before being sequentially applied to the image processing apparatus 14 via an interface (I/F) circuit 104. The CDS 102 is used to reduce the image data to image data accurately corresponding to the quantity of accumulated charge in each CCD cell by subtracting field-through data indicating a field-through signal level from the image data.

As photometric signals of R, G and B are outputted from the image sensor 68 in parallel, there are provided three systems each comprising the amplifier 98, the A/D converter 100 and the CDS 102 and image data on R, G and B are outputted in parallel from the I/F circuit 104 as scanning image data.

Although the scanner 12 exemplarily shown in FIGS. 2a and 2b is a device for reading the image photographed on the film F by means of the slit scanning exposure, the present invention is not limited to this arrangement but may be utilized for any device for reading the image photographed on the film F by means of so-called surface exposure.

In this case, one area CCD sensor instead of the three line CCD sensors is employed as an image sensor and a turret having color filters of R, G and B is disposed between a light source and a light diffusion box. Furthermore, a mask formed in a carrier corresponds in size to a film, so that the film F is intermittently transported frame by frame.

In the case of a scanner using the area CCD sensor, the carrier is used to hold one frame photographed on the film F in a predetermined read position and the color filters of R, G and B are successively caused to act on each of the read light paths, whereby the projection light transmitted through the film F is read by the area CCD sensor. Thus, the image photographed on the film F is reduced into the three primary colors of R, G and B for reading purposes.

Figure 5:
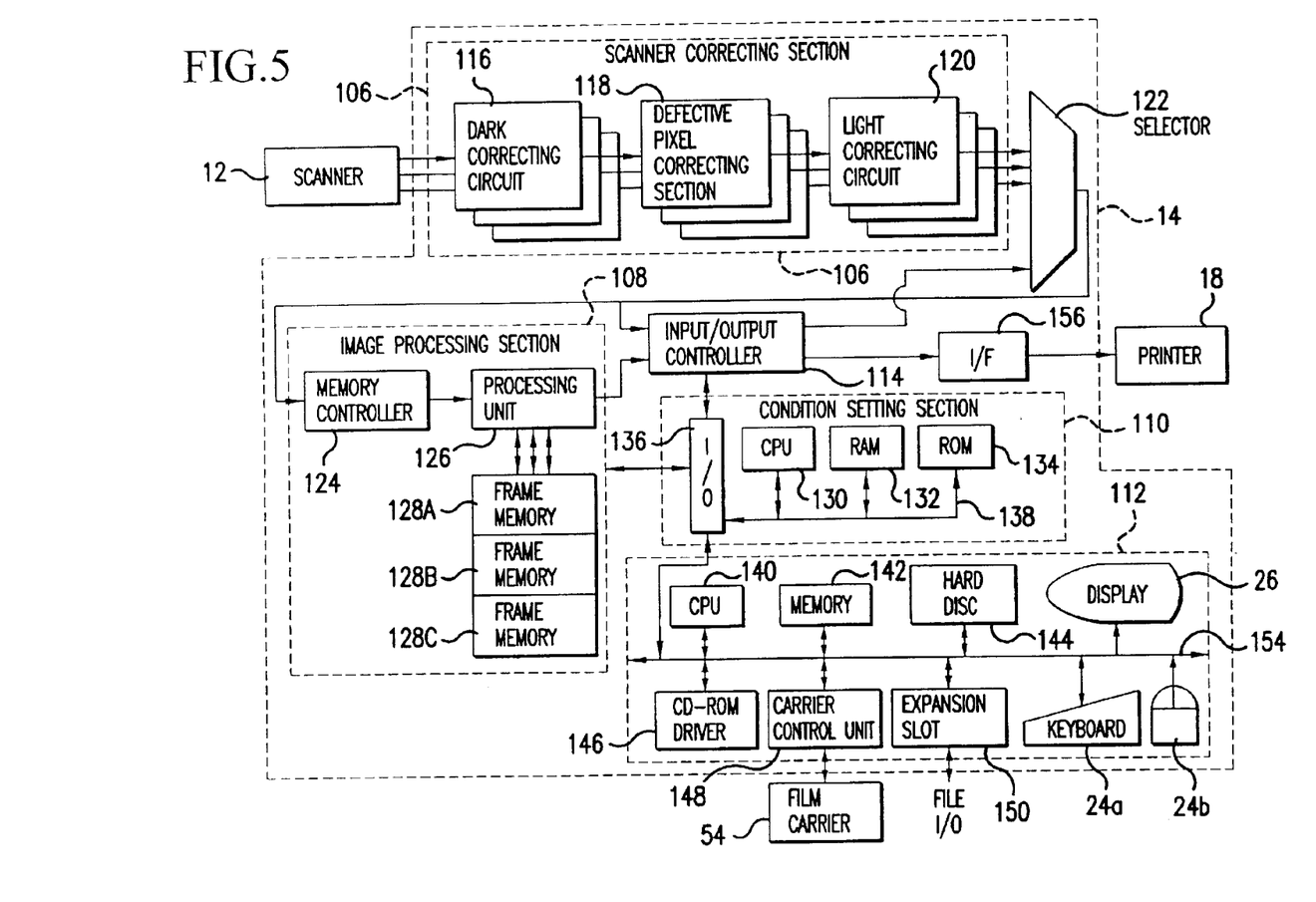
FIG. 5 is a block diagram of an image input apparatus of the photograph printing and developing machine shown in FIG. 1.

FIG. 5 is a block diagram of the image processing apparatus 14.

The image processing apparatus 14 comprises a scanner correcting section 106, an image processing section 108, a condition setting section 110, a personal computer 112 and an input-output controller 114.

In the scanner correcting section 106 exists three signal processing systems each comprising a dark correcting circuit 116, a defective pixel correcting section 118 and a light correcting circuit 120, the signal processing systems corresponding to image data on R, G, B outputted from the scanner 12 in parallel.

The dark correcting circuit 116 is used to correct the dark (current) of the image sensor 68 through the steps of, for example, measuring the image data (data indicating the dark output level of each cell (pixel) of the image sensor 68) outputted from the scanner 12, storing the measured results on a pixel basis and subtracting the data at the dark output level from the image data on the film F outputted from the scanner 12.

The defective pixel correcting section 118 is used to correct the defective pixel of the image sensor 68 through the steps of, for example, storing the address of the (defective) pixel regarded as being abnormally outputted from the image data on the adjusting film (reference original) read by the scanner 12 and outputting image data on the defective pixel by interpolating image data on peripheral pixels out of the image data on the film F outputted from the scanner 12.

The light correcting circuit 120 is used to correct variation of each pixel of the image sensor 68 through the steps of deciding a gain on a pixel basis for correcting variation of each pixel output using the image data on the adjusting film likewise and correcting the image data on the film F outputted from the scanner 12 on a pixel basis according to the gain.

Since the three line CCD sensors are arranged with a space left among them in the auxiliary scanning direction, there is a time lag in timing at which the outputting of the respective image data on R, G and B from the scanner 12 is commenced. In the scanner correcting section 106, image-data output timing is delayed at different delay time on a component color basis so that data on R, G, B of the same pixel over the image are outputted simultaneously.

The image data outputted from the scanner correcting section 106 is inputted to a selector 122. The input terminal of the selector 122 is also connected to the data output terminal of the input-output controller 114 and the image data supplied from the outside is inputted to the selector 122 from the input-output controller 114.

The output terminal of the selector 122 is connected to the input-output controller 114 and the image processing section 108. The selector 122 selectively feeds the supplied image data into the input-output controller 114 and the image processing section 108.

The image processing section 108 comprises a memory controller 124, a processing unit 126 and three frame memories 128A, 128B, 128C.

Each of the frame memories 128A, 128B, 128C has a capacity of storing image data equivalent to one frame and the image data fed from the selector 122 is processed in the processing unit 126 and sent to the input-output controller 114 or stored in one of the three frame memories 128 as the need arises. The memory controller 124 controls addresses when image data is stored in each frame memory 128 so that pixels of the image data thus fed in are stored in such a manner that they are lined up in predetermined order in the storage area of the frame memory 128.

The processing unit 126 subjects image data for the main scanning to predetermined image processing including, for example, gray (color) balance adjustment, gradation correction, density correction (brightness correction), provision of dodging effect (compression/extension of density dynamic range), chromaticness correction, sharpness processing and the like in order to create output image data.

These sorts of processing is performed by a known method in which arithmetic operations, processing with LUT (lookup-table), processing with filters and the like are properly combined, and processing conditions (setting of operational coefficients, preparation for LUT and MTX operations) together with image read conditions for the main scanning are set in the condition setting section 110.

The processing unit 126 is connected to the input-output controller 114 and the image data subjected to image processing is fed into the input-output controller 114 or otherwise fed into the input-output controller 114 at predetermined timing after being stored in the frame memory 128 once.

According to the present invention, reading of an image in each frame photographed on the film F is carried out through double image reading including pre-reading (hereinafter called the pre-scanning) with low resolution and main reading (hereinafter called the main scanning) with high resolution.

The pre-scanning is carried out to read the film F with the image read conditions under which the accumulatable time of the line CCD sensor (electronic shutter speed), the stopping value of the variable diaphragm 48 and the like have been set lest the output of the image sensor 68 should be saturated even when the density of the image photographed on the film F is extremely low (e.g., over exposed negative image).

The image data obtained from the pre-scanning (pre-scanning data) is inputted to the input-output controller 114 from the selector 122 and then supplied from the input-output controller 114 to the condition setting section 110.

The condition setting section 110 comprises CPU 130, RAM 132, ROM 134 (e.g., ROM whose storage contents are rewritable) and an input-output (I/O) port 136, these being connected via a bus 138.

The condition setting section 110 is a region where area data corresponding to each frame (image) of the film (pre-scanned image data) is extracted according to the pre-scanned data fed from the input-output controller 114; the frame position is detected; and frame-to-frame image processing conditions as well as (image) read conditions at the time of the main scanning are set.

More specifically, in the condition setting section 110, preparation of a density histogram and calculation of the quantity of image characteristics including mean density, LATD (Large Area Transmission Density), highlight (lowest density), shadow (highest density) and the like are carried out with respect to the pre-scanned image data frame by frame. In addition, the quantity of image characteristics of one or a plurality of frames is used in compliance with the designation given by an operator employing an operating system 24, if necessary, to set conditions of image processing such as the aforesaid gray balance adjustment, brightness correction and the like frame by frame.

When the image processing and read conditions are examined in the condition setting section 110, the set image processing conditions and the pre-scanned image data are fed into the personal computer 112. The image in this case is displayed on the display 26 connected to the personal computer 112 as a simulation image.

Although the image processing conditions are properly adjusted (or modified) in an ordinary input apparatus when the designation based on the examination made by the operator as to the adjustment of the image including color and density adjustments is given, not only the image processing conditions but also the read conditions (e.g., at least one of the quantity of read light (the quantity of light from the light source 36 and/or the stopping value of the variable diaphragm 48), the stopping value of the lens diaphragm 66 and the accumulatable time of the line CCD sensor) are even reflected in the image adjustments designated by the operator in the input apparatus according to the present invention.

Normally, the read conditions at the time of the main scanning are set from the pre-scanned image data so as to prevent the output of the image sensor 68 from being saturated even when the image (original image) has the lowest density (Dmin).

In cases where the film F is a reversal film and where an image is photographed under conditions of backlight and insufficient exposure, the examination made by the operator results in designating density adjustment such that print density is lowered in order to properly reproduce the face of a person in the print. In this case, according to the present invention, the read conditions at the time of the main scanning are set so that the image sensor 68 is saturated with density higher than the lowest density of the original image. When it is designated to raise the print density as density adjustment with a negative film as the film F, the read conditions at the time of the main scanning are set so that the image sensor 68 is saturated with density higher than the lowest density of the original image likewise.

When it is designated to raise the print density with a reversal film as the film F or lower the print density with a negative film as the film F, the read conditions at the time of the main scanning are set so that the image sensor 68 is saturated with density lower than the lowest density of the original image.

When the original has color failure and the like, moreover, tinting adjustment is made but the accumulatable time of each line CCD sensor at the time of the main scanning, for example, is set accordingly in this case.

In a case where the principal part of the image photographed on the film F with the arrangement above has extremely high or low density because of photographic conditions originating from under- or over-exposure, backlight, electronic flashing and the like or has color failure, it is possible to obtain a high-grade print by properly making a reproduction of the image.

In the image input apparatus according to the present invention, the read conditions at the time of the main scanning are such that the read conditions are set from the pre-scanned image data so that the image sensor 68 is saturated with the lowest density of the original image and when image adjustment is designated, the read conditions previously set may be adjusted (modified) accordingly or the read conditions may be set in conformity with the pre-scanned image data and the designation of image adjustment after the image processing conditions are definitely decided as will be described hereinafter.

The method of setting the read conditions corresponding to the inputting of image adjustment is not specifically restricted and there is shown a method of setting read conditions by way of example so that the output signal of the image sensor 68 is changed by a predetermined quantity (e.g., equal value, ½, etc.) corresponding to the entered quantity of density adjustment against the read conditions set so that the output of the image sensor 68 is saturated with the lowest density of the original image, for example.

In the image input apparatus according to the present invention, further, it is not restrictive that the image adjustment made by the operator is necessarily reflected in the read conditions at the time of the main scanning but may be so arranged that while the quantity of density adjustment is decided to be at a predetermined threshold value or greater beforehand, for example, ordinary read conditions corresponding to the lowest density of the original image are set when the threshold value is less than what has been predetermined and the image adjustment is reflected in the read conditions only when the image adjustment is made at what is greater than the predetermined threshold value.

When the image processing conditions are definitely decided, the condition setting section 110 supplies the image processing conditions thus decided to the processing unit 126 of the image processing section 108 and also supplies the position and read conditions of each detected frame to the microprocessor 72 of the scanner 12. The microprocessor 72 drives the motor driver 82, for example, to adjust the image read conditions according to the frame-to-frame read conditions supplied at the time of the main scanning and reads the image according to the supplied information concerning the position of each frame.

The personal computer 112 (hereinafter called PC 112) comprises CPU 140, a memory 142, a hard disc 144, a CD-ROM driver 146, a carrier control apparatus 148 and an expansion slot 150, these being connected via a bus 154. The keyboard 24a and the mouse 24b are also connected to the bus 154.

The carrier control apparatus 148 is connected to the carrier 54 and used to control the transportation of the film F by the carrier 54. In a case where the carrier 54 is adapted for the Advanced Photo System, the information read by the carrier 54 from the magnetic recording medium of the film is inputted to the image processing apparatus 14 from the carrier control apparatus 148.

Moreover, a driver for reading/writing data from/to a recording medium such as a memory card, a unit (not shown) for communicating with any other information processing equipment and the like are connected to the PC 112 via the expansion slot 150.

When the image processing conditions set in the condition setting section 110 are examined as aforesaid, the pre-scanned image data and the set image processing conditions are supplied to the PC 112 in which the pre-scanned image data of each frame is processed under corresponding image processing conditions and a simulation image is displayed on the display 26.

During the time the image processing conditions are examined, image adjustment is chiefly designated through the keyboard 24a. In the PC 112, the image processing conditions are adjusted (modified) in accordance with the designation of adjustment and the simulation image displayed on the display 26 is modified accordingly and besides information concerning the designation of image adjustment is supplied to the condition setting section 110. The image processing conditions are also adjusted in the condition setting section 110 according to the designation of adjustment. The designation of image adjustment is as aforesaid reflected in the read conditions at the time of the main scanning in the input apparatus 16 according to the present invention.

The input-output controller 114 is connected to the printer 18 via an I/F circuit 156.

When the image data subjected to image processing is used for image recording on the photosensitive material in the printer 18, the output image data subjected to the image processing in the image processing section 108 is supplied to the printer 18 as output image data via the I/F circuit 156 from the input-output controller 114. When the image data is outputted outside as an image file, the image data subjected to the image processing in the image processing section 108 is supplied to the PC 112 via the condition setting section 110 from the input-output controller 114.

The output apparatus 22 which comprises the printer 18 and the processor 20 records a latent image by exposing photosensitive material (photographic paper) according to the image data outputted from the image processing apparatus 14 (input apparatus 16) and outputs a print (finish) by subjecting the latent image to predetermined developing processing.

The printer 18 is used, for example, to record the latent image by subjecting photosensitive material in the form of a cut sheet to light beam scanning exposure by following the steps of cutting the photosensitive material in lengths for preparing prints, recording back prints, modulating light beams of three kinds for R, G and B exposure corresponding to the spectral sensitivity characteristics of the photosensitive material according to image data (recording image) to deflect the beams in the main scanning direction, transporting the photosensitive material in a pre-scanning direction intersecting the main scanning orthogonally in order to record the latent image by subjecting the photosensitive material to two-dimensional scanning exposure using the light beams and sending the exposed photosensitive material to the processor 20.

In the processor 20, predetermined wet developing processing including coloring development, bleach-fixation, washing and the like is applied to the supplied photosensitive material in order to convert the latent image to a visible image, which is subsequently dried to make a print, and then the prints are sorted out and stacked up by lots equivalent to a roll of film.

A detailed description will subsequently be given of the image input apparatus according to the present invention by explaining the function of the photograph printing and developing machine 10.

The photograph printing and developing machine 10 is started and the carrier 54 corresponding to a film F to be read is mounted in a predetermined position of the work table 32. The operator makes sure that the input apparatus 16 is in the predetermined state with reference to, for example, the quantity of light from the light source 36 and mounts the film F (cartridge in the case of the Advanced Photo System) for use in making prints in the predetermined position of the carrier 54.

When the carrier 54 confirms the fitting of the film F, the scanner 12 enters a pre-scanning mode wherein the stopping value of the variable diaphragm 48 and the accumulatable time of each line CCD sensor of the image sensor 68 are set according to the predetermined pre-scanning read conditions.

Simultaneously, the casting 56 and the lens unit 64 are vertically moved according to the film size and the print size so adjust the magnification.

When the scanner 12 reaches a state corresponding to pre-scanning, the carrier 54 starts scan-transporting the film F at the pre-scanning speed in the auxiliary scanning direction and the read light emitted from the light source 36, adjusted by the variable diaphragm 48 and diffused by the light diffusion box 50 is incident on the film F held in the predetermined position by the carrier 54. Then the projection light is formed into an image in the image sensor 68 by the lens unit 64 and the image is photoelectrically read by each of the line CCD sensors of R, G and B.

As aforesaid, the read light is slit light extending in the main scanning direction and since the film F is transported in the auxiliary scanning direction intersecting the main scanning direction coinciding with the longitudinal direction, the film F is two-dimensionally scanned by the slight light. The pre-scanning is started from the leading end of the film F until its trailing end is transported to the read position. Consequently, the whole surface of the film F is scanned by the read light and the image is wholly read by the image sensor 68.

The output signal of the image sensor 68 is amplified by the amplifier 98, converted by the A/D converter 100 into digital image data, corrected by the CDS 102 and sent from the I/F circuit 104 to the image processing apparatus 14 as the pre-scanned data.

The pre-scanned data sent to the image processing apparatus 14 is subjected to dark correction, defective pixel correction and bright correction in the scanner correcting section 106, fed into the input-output controller 114 by the selector 122 and sent to the condition setting section 110.

In the condition setting section 110, the image data of each frame, that is, the pre-scanned image data is extracted from the pre-scanned data so as to detect the frame position and the preparation of the density histogram as well as the calculation of the quantity of image characteristics are carried out frame by frame, so that the image processing conditions of each frame is set from the quantity of image characteristics of one or the plurality of frames.

In this embodiment, moreover, the read conditions (only the stopping value of the variable diaphragm 48 is changed to pre-scanning by way of example) under which the output of the image sensor 68 is saturated with the lowest density of the image of each frame of the film F are set as temporary read conditions at the time of the main scanning frame by frame.

When the image pre-scanning are examined by the operator, the pre-scanned image data with the set image processing conditions is sequentially sent to the PC 112. In the PC 112, the pre-scanned image data thus received is processed according to the corresponding image processing conditions and the image thus processed is displayed on the display 26 as a simulation image to be reproduced on a print.

The simulation image on the display 26 may be displayed in such a manner that the whole image equivalent to a roll of film, for example, 24 frames may be displayed thereon or a plurality of frames such as one frame each time, two frames or six frames may be displayed selectively as designated by the operator or otherwise these display methods may selectively be switched from one to another.

While looking at the simulation image displayed on the display 26, the operator makes the examination and the image adjustment frame by frame using adjusting keys of the keyboard 24a, for example, a density adjusting key, a color adjusting key, a γ (gradation) adjusting key, a sharpness adjusting key and the like as occasion demands.

Accordingly, the previously set image processing conditions are adjusted (corrected) and simultaneously the simulation image displayed on the display 26 is also varied. In the input apparatus 16 according to the present invention, the read conditions are adjusted when the image adjustment is made correspondingly and as illustrated in the drawings, the stopping value of the variable diaphragm 48 under the previously set temporary read conditions is changed so that the output of the image sensor 68 is varied to an extent corresponding to the quantity of density adjustment in response to the density adjustment.

When the operator decides that the image of the frame involved is appropriated (examination OK), he designates the termination of examining the image of the frame and examines the image of the next frame.

When examining the images of the all frames of a roll of film is thus terminated, the operator designates the commencement of the printing operation.

Under the designation above, the image processing conditions and the read conditions at the time of the main scanning are definitely decided frame by frame and the position and the image processing conditions of each frame are sent to the processing unit 126 of the image processing section 108 and the read conditions to the microprocessor 72 of the scanner 12. Subsequently, the carrier 54 starts transporting the film F at a speed corresponding to the main scanning and carries out the main scanning. Transporting the film F at the time of the main scanning may be directed opposite to the pre-scanning direction or directed in the same direction as the pre-scanning direction by rewinding the film F after the pre-scanning is terminated.

In the input apparatus 16 according to the present invention, it is not necessarily restrictive making the operator make such an examination but may be allowed to make a print without the examination. At this time, the image processing conditions are definitely decided at a point of time that the image processing conditions and the read conditions at the time of the main scanning are set in the condition setting section 110 and then the main scanning is carried out. When the examination is not made by the operator, moreover, the simulation image may not be displayed on the display 26.

The presence or absence of the examination is preferably made selectable as a working mode.

When the main scanning is started, the stopping value of the variable diaphragm 48 is adjusted according to the read conditions corresponding to a frame to be initially read before the frame is transported to the read position and when the frame is transported to the read position, the frame is detected from information concerning the position of the frame thus transferred and the image sensor 68 starts reading the image like the preceding pre-scanning except that read pixel density is different.

While the second frame is transported to the read position after the first frame has completely been read, the stopping value of the variable diaphragm 48 is adjusted according to the read conditions corresponding to the second frame and when the second frame is transported to the read position, this frame is read likewise. Images of the third frame and thereafter are successively read likewise.

The image data outputted from the scanner 12 is processed in the scanner correcting section 106 and then sent by the selector 122 to the image processing section 108 where the image data is subjected to the image processing according to the image processing conditions set to correspond to each frame. Output image data resulting from a series of steps as described above is sent from the input-output controller 114 via the I/F circuit 156 to the printer 18.

On receiving the output image data, the printer 18 operates to record the back print and form the latent image by subjecting the photosensitive material to the scanning exposure with the light beam modulated according to the image data, whereby to transport the latent image to the processor 20 as described above.

The exposed photosensitive material transported to the processor 20 is subjected to the predetermined processing including the wet developing processing, drying and the like and outputted as a print. Then the prints are sorted out and stacked up.

Although the main scanning is carried out after the whole frame photographed on the film F has been pre-scanned and examined in the aforesaid embodiment, the present invention is not limited to the arrangement above but may be implemented so that a plurality of frames as prescribed, namely, six frame and so on are pre-scanned and examined before being subjected to the main scanning at a time or otherwise processing is performed frame by frame. Since the pre-scanning and the main scanning are accompanied with of reciprocative transporting of the film F in the case of slit scanning, however, this mode of processing one frame after another is fit for use in an input apparatus for surface exposure using the aforesaid area CCD sensors.

It is also acceptable to follow the steps of fulfilling the ordinary read conditions under which the image sensor is not saturated with the lowest density of the original image after carrying out the pre-scanning, then setting the image processing conditions and making the examination, again fulfilling the read conditions reflecting the image adjustment resulting from the examination with respect to only the frame decided so that the examination is needed, performing the image processing with the result of reading the frame as the image data at the time of the main scanning and further performing the image processing with the image data obtained from the second reading as the image data at the time of the main scanning regarding another frame.

For the same reason as the aforesaid, this mode is also fit for use in the input apparatus for surface exposure using the aforesaid area CCD sensors.

The present invention is not limited to the aforesaid embodiment though a detailed description has been given of the image input apparatus according to the present invention but may needless to say be modified and improved in various manners without departing from the spirit and scope of the invention.

As set forth above in detail, the image input apparatus according to the present invention is such that in a case where the principal part of the image photographed on the film has extremely high or low density because of photographic conditions originating from backlight, electronic flashing, under- or over-exposure and the like or has color failure, it is possible to stably output a print (visible image) reproduced from a quality image by properly making a reproduction of the image.

What is claimed is:

1. An image input apparatus for photoelectrically reading an image and applying predetermined image processing to image data obtained so as to provide output image data comprising:

pre-reading means for reading the image before main reading is carried out to obtain the output image data;

processing-condition setting means for setting image processing conditions according to the image data obtained from the pre-reading;

display means for processing the image data obtained from the pre-reading according to the image processing conditions set by the processing-condition setting means and displaying the processed image data;

adjusting means for designating the adjustment of the image processing conditions set by the processing-condition setting means after the image is displayed on the display means;

read-condition determining means for determining main read conditions according to the image data obtained from the pre-reading and the designation of the adjustment of the image processing conditions specified by the adjusting means;

means for definitely deciding the image processing conditions; and designating means for designating the commencement of the main reading.

2. The image input apparatus as claimed in claim 1, wherein said read means for photoelectrically reading the original image is a CCD sensor, the designation of the adjustment of the image processing conditions to be reflected in the main read conditions determined by the read-condition determining means is concerned with density adjustment, and the read conditions affected by the density adjustment signify at least one of the adjustment of the quantity of light and the accumulatable time of the CCD sensor.

3. The image input apparatus as claimed in claim 1, wherein said read means for photoelectrically reading the original image is a CCD sensor, the designation of the adjustment of the image processing conditions to be reflected in the main read conditions determined by the read-condition determining means is concerned with the adjustment of tinting and density, and the read conditions affected by the adjustment of the tinting and density signify at least one of the adjustment of the quantity of light and the accumulatable time of the CCD sensor.

4. The apparatus of claim 1, wherein pre-reading and main reading are performed as the only scans of the original image to provide the output image data.

5. An image input apparatus for photoelectrically reading an original image and applying predetermined image processing to image data obtained so as to provide output image data comprising:

pre-reading means for reading the original image with a resolution lower than that of main reading before the main reading is carried out to obtain the output image data;

processing-condition setting means for setting image processing conditions of said frame according to the image date obtained from the pre-reading;

display means for processing the image data obtained from the pre-reading according to the image processing conditions set by the processing-condition setting means and displaying the processed image data;

adjusting means for designating an adjustment of the image processing conditions set by the processing-condition setting means after an image is displayed on the display means;

read-condition determining means for determining read conditions for the main reading according to the image data obtained from the pre-reading and the designation of the adjustment of the image processing conditions specified by the adjusting means;

means for definitely deciding the image processing conditions; and designating means for designating the commencement of the main reading.

6. The image input apparatus as claimed in claim 5, wherein said read means for photoelectrically reading the original image includes a CCD sensor, the designation of the adjustment of the image processing conditions to be reflected in the read conditions for the main reading determined by the read-condition determining means is concerned with the adjustment of tinting and density, and the read conditions for the main reading affected by the adjustment of the tinting and density signify at least one of the adjustment of the quantity of light and the accumulatable time of the CCD sensor.

7. The image input apparatus as claimed in claim 5, wherein said read means for photoelectrically reading the original image includes a CCD sensor, the designation of the adjustment of the image processing conditions to be reflected in the read conditions for the main reading determined by the read-condition determining means is concerned with density adjustment, and the read conditions for the main reading affected by the density adjustment signify at least one of the adjustment of the quantity of light and the accumulatable time of the CCD sensor.

8. The apparatus of claim 5, wherein pre-reading and main reading are performed as the only scans of the original image to provide the output image data.

9. An image input apparatus for photoelectrically reading an original image and applying predetermined image processing to image data obtained so as to provide output image data comprising;

pre-scanning means for reading the original image with a resolution lower than those of main reading and pre-reading before the main reading for obtaining the output image data and the pre-reading prior to the main reading are carried out;

first read-condition determining means for determining reading conditions for the pre-reading according to image data read by the pre-scanning means;

pre-reading means for reading the original image under said read conditions for the pre-reading determined by said first read condition determining means;

processing-condition setting means for setting image processing conditions according to the image data obtained from the pre-reading;

display means for processing the image data obtained from the pre-reading according to the image processing conditions set by the processing-condition setting means and displaying the processed image data;

adjusting means for designating an adjustment of the image processing conditions set by the processing-condition setting means after an image is displayed on the display means;

second read-condition determining means for determining read conditions for the main reading according to the image data obtained from the pre-reading and the designation of the adjustment of the image processing conditions specified by the adjusting means;

means for definitely deciding the image processing conditions; and designating means for designating the commencement of the main reading.

10. The image input apparatus as claimed in claim 9, wherein said read means for photoelectrically reading the original image includes a CCD sensor, the designation of the adjustment of the image processing conditions to be reflected in the read conditions for the main reading determined by the read-condition determining means is concerned with the adjustment of tinting and density, and the read conditions for the main reading affected by the adjustment of the tinting and density signify at least one of the adjustment of the quantity of light and the accumulatable time of the CCD sensor.

11. The image input apparatus as claimed in claim 9, wherein said read means for photoelectrically reading the original image includes a CCD sensor, the designation of the adjustment of the image processing conditions to be reflected in the read conditions for the main reading determined by the read-condition determining means is concerned with density adjustment, and the read conditions for the main reading affected by the density adjustment signify at least one of the adjustment of the quantity of light and the accumulatable time of the CCD sensor.

12. The apparatus of claim 9, wherein pre-reading and main reading are performed as the only scans of the original image to provide the output image data.

13. An image input apparatus, comprising:

reading means for photoelectrically reading an original image;

image processing means for applying predetermined image processing to image data obtained by the reading means so as to provide output image data;

pre-reading means for reading the original image before main reading is carried out to obtain the output image data;

processing-condition setting means for setting image processing conditions of said image processing means according to the image data obtained from the pre-reading;

display means for processing the image data obtained from the pre-reading according to the image processing conditions set by the processing condition setting means and displaying the processed image data;

adjusting means for designating the adjustment of the image processing conditions set by the processing-condition setting means after an image is displayed on the display means;

read-condition determining means for determining read conditions for the main reading according to the image data obtained from the pre-reading and the designation of the adjustment of the image processing conditions specified by the adjusting means;

at least one of read-time adjustment means for adjusting a read time with said reading means and a diaphragm for adjusting quantity of light from a light source incident on said reading means, according to said read conditions for the main reading determined by the read-condition determine means;

means for definitely deciding the image processing conditions of said image processing means; and designating means for designating the commencement of the main reading.

14. The image input apparatus as claimed in claim 13, wherein
said read means for photoelectrically reading the original image includes a CCD sensor,
said diaphragm includes at least one of a variable diaphragm and a lens diaphragm,
the designation of the adjustment of the image processing conditions to be reflected in the read conditions for the main reading determined by the read-condition determining means is concerned with the adjustment of tinting and density, and
the read conditions for the main reading affected by the adjustment of the tinting and density signify at least one of the adjustment of the quantity of light with said diaphragm and the accumulatable time of the CCD sensor with said read-time adjustment means.

15. The image input apparatus as claimed in claim 13, wherein
said read means for photoelectrically reading the original image includes a CCD sensor,
said diaphragm includes at least one of a variable diaphragm and a lens diaphragm,
the designation of the adjustment of the image processing conditions to be reflected in the read conditions for the main reading determined by the read-condition determining means is concerned with density adjustment, and
the read conditions for the main reading affected by the density adjustment signify at least one of the adjustment of the quantity of light with said diaphragm and the accumulatable time of the CCD sensor with said read-time adjustment means.

16. The apparatus of claim 13, wherein pre-reading and main reading are performed as the only scans of the original image to provide the output image data.

17. An image input apparatus, comprising:
reading means for photoelectrically reading an original image;
image processing means for applying predetermined image processing to image data obtained by the reading means so as to provide output image data;
pre-reading means for reading the original image before main reading is carried out to obtain the output image data;
processing-condition setting means for setting image processing conditions under which said image processing means carries out said predetermined image processing according to the image data obtained from the pre-reading;
display means for processing the image data obtained from the pre-reading according to the image processing conditions set by the processing-condition setting means and displaying the processed image data;
adjusting means for designating the adjustment of the image processing conditions set by the processing-condition setting means after an image is displayed on the display means;
read-condition determining means for determining read conditions for the main reading according to the image data obtained from the pre-reading and the designation of the designation of the adjustment of the image processing conditions specified by the adjusting means;
means for definitely deciding the image processing conditions under which said image processing means carries out said predetermined image processing; and
designating means for designating the commencement of the main reading.

18. The image input apparatus as claimed in claim 17, wherein
said read means for photoelectrically reading the original image includes a CCD sensor,
the designation of the adjustment of the image processing conditions to be reflected in the read conditions for the main reading determined by the read-condition determining means is concerned with density adjustment, and
the read conditions for the main reading affected by the density signify at least one of the adjustment of the quantity of light and the accumulatable time of the CCD sensor.

19. The image input apparatus as claimed in claim 17, wherein
said read means for photoelectrically reading the original image includes a CCD sensor,
the designation of the adjustment of the image processing conditions to be reflected in the read conditions for the main reading determined by the read-condition determining means is concerned with the adjustment of tinting and density, and
the read conditions for the main reading affected by the adjustment of the tinting and density signify at least one of the adjustment of the quantity of light and the accumulatable time of the CCD sensor.

20. The apparatus of claim 17, wherein pre-reading and main reading are performed as the only scans of the original image to provide the output image data.

21. A method for furnishing output image data for outputting a high quality image comprising:
designating an adjustment associated with one or more previously set image processing conditions and an adjustment input; and determining one or more main read conditions independent of the designated adjustment and designating one or more final image processing conditions prior to main reading.

22. A system for furnishing output image data for outputting a high quality image comprising:
an input device; and
processor coupled to the input device, the processor configured to:
designate an adjustment associated with one or more previously set image processing conditions and an adjustment input received from the input device; and
determine one or more main read conditions at a first resolution independent of the designated adjustment and designating one or more final image processing conditions prior to main reading at a second higher resolution.

23. An image input apparatus for photoelectrically reading an image and applying predetermined image processing to image data obtained so as to provide output image data, the apparatus comprising:
a display;
an input device; and
a processor coupled to the input device and the display, the processor configured to:
pre-read the image at a first resolution before a main read operation to obtain the output image data at a second higher resolution;
set one or more image processing conditions according to the obtained output image data;
process the obtained output image data according to the set one or more image processing conditions and displaying the processed output image data on the display;
designate an adjustment of the set one or more image processing conditions after the output image data is displayed;
determine one or more main read conditions based on the obtained output image data and the designated adjustment;
decide one or more final image processing conditions; and
commence the main read operation.

24. The image input apparatus of claim 23, further including a CCD sensor and wherein the processor in pre-reading is further configured to input the image from the CCD sensor, and wherein the designated adjustment further includes a tinting and density adjustment, and wherein the tinting and density adjustment further includes at least one of an adjustment of the quantity of light associated with the CCD sensor, and an adjustment of the accumulated time associated with the CCD sensor.

25. The image input apparatus of claim 23, further including a CCD sensor and wherein the processor in pre-reading is further configured to input the image from the CCD sensor, and wherein the designated adjustment further includes a density adjustment, and wherein the density adjustment further includes at least one of an adjustment of the quantity of light associated with the CCD sensor, and an adjustment of the accumulated time associated with the CCD sensor.

26. The apparatus of claim 23, wherein pre-reading and main reading are performed as the only scans of the original image to provide the output image data.

27. An image input apparatus for photoelectrically reading an original image of a frame and applying predetermined image processing to image data obtained so as to provide output image data for outputting a photographic print of said frame comprising:
pre-reading means for reading the original image before main reading is carried out to obtain the output image data of said frame;
processing-condition setting means for setting image processing conditions of said frame according to the image data obtained from the pre-reading;
display means for processing the image data of said frame obtained from the pre-reading according to the image processing conditions set by the processing-condition setting means and displaying a reproduced image of said frame of the processed image data;
adjusting means for designating the adjustment of the image processing conditions of said frame set by the processing-condition setting means after the original image is displayed on the display means;
read-condition determining means for determining main read conditions of the original image of said frame for the main reading according to the image data obtained from the pre-reading and the designation of the adjustment of the image processing conditions specified by the adjusting means;
means for definitely deciding the image processing conditions of said frame; and
designating means for designating the commencement of the main reading of the original image of said frame.

28. The image input apparatus as claimed in claim 27, wherein
said read means for photoelectrically reading the original image is a CCD sensor,
the designation of the adjustment of the image processing conditions to be reflected in the read conditions for the main reading determined by the read-condition determining means is concerned with the adjustment of tinting and density, and the read conditions for the main reading affected by the adjustment of the tinting and density signify at least one of the adjustment of the quantity of light and the accumulatable time of the CCD sensor.

29. The image input apparatus as claimed in claim 27, wherein
said read means for photoelectrically reading the original image is a CCD sensor,
the designation of the adjustment of the image processing conditions to be reflected in the read conditions for the main reading determined by the read-condition determining means is concerned with density adjustment, and
the read conditions for the main reading affected by the density adjustment signify at least one of the adjustment of the quantity of light and the accumulatable time of the CCD sensor.

30. The apparatus of claim 27, wherein pre-reading and main reading are performed as the only scans of the original image to provide the output image data.

31. An image input apparatus for photoelectrically reading an original image of a frame and applying predetermined image processing to image data obtained so as to provide output image data comprising:
a pre-reading module for reading the original image with a resolution lower than that of main reading before the main reading is carded out to obtain the output image data;

a processing-condition setting module for setting image processing conditions of said frame according to the image date obtained from the pre-reading;

a display module for processing the image data obtained from the pre-reading according to the image processing conditions set by the processing-condition setting module and displaying the processed image data;

an adjusting module for designating an adjustment of the image processing conditions set by the processing-condition setting module after an image is displayed on the display module;

a read-condition determining module for determining read conditions for the main reading according to the image data obtained from the pre-reading and the designation of the adjustment of the image processing conditions specified by the adjusting module;

a deciding module for definitely deciding the image processing conditions; and a designating module for designating the commencement of the main reading.

32. The apparatus of claim 31, wherein pre-reading and main reading are performed as the only scans of the original image to provide the output image data.

* * * * *

UNITED STATES PATENT AND TRADEMARK OFFICE
CERTIFICATE OF CORRECTION

PATENT NO. : 6,757,083 B1
DATED : June 29, 2004
INVENTOR(S) : Nakamura

It is certified that error appears in the above-identified patent and that said Letters Patent is hereby corrected as shown below:

Column 17,
Line 14, "date" should read -- data --.

Column 19,
Line 10, "processing condition" should read -- processing-condition --

Column 22,
Line 64, "carded" should read -- carried --.

Column 23,
Line 3, "date" should read -- data --.

Signed and Sealed this

First Day of February, 2005

JON W. DUDAS
*Director of the United States Patent and Trademark Office*